(12) United States Patent
Hahn et al.

(10) Patent No.: US 7,321,583 B2
(45) Date of Patent: Jan. 22, 2008

(54) DATA TRAFFIC SEPARATION METHOD FOR USE IN A PACKET-ORIENTED MOBILE RADIO NETWORK

(75) Inventors: Wolfgang Hahn, Bergfelde (DE); Mirko Schramm, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 89 days.

(21) Appl. No.: 10/559,776

(22) PCT Filed: Jun. 2, 2004

(86) PCT No.: PCT/DE2004/001153

§ 371 (c)(1),
(2), (4) Date: Dec. 7, 2005

(87) PCT Pub. No.: WO2004/112320

PCT Pub. Date: Dec. 23, 2004

(65) Prior Publication Data

US 2006/0239193 A1    Oct. 26, 2006

(30) Foreign Application Priority Data

Jun. 10, 2003 (DE) ................................ 103 26 726

(51) Int. Cl.
*H04J 3/24* (2006.01)

(52) U.S. Cl. .................... 370/349; 370/336; 370/231; 370/332; 370/395.21; 705/4; 709/229; 709/203

(58) Field of Classification Search ................ 370/338, 370/231, 332, 395.21, 235, 349
See application file for complete search history.

(56) References Cited

U.S. PATENT DOCUMENTS

| | | | |
|---|---|---|---|
| 6,137,777 A * | 10/2000 | Vaid et al. | 370/230 |
| 6,880,009 B2 * | 4/2005 | Charas | 709/226 |
| 6,937,566 B1 * | 8/2005 | Forslow | 370/231 |
| 7,107,620 B2 * | 9/2006 | Haverinen et al. | 726/29 |
| 7,113,478 B2 * | 9/2006 | Bauer et al. | 370/235 |
| 7,171,460 B2 * | 1/2007 | Kalavade et al. | 709/223 |
| 7,185,257 B2 * | 2/2007 | Kim et al. | 714/751 |
| 7,194,000 B2 * | 3/2007 | Balachandran et al. | 370/395.42 |
| 7,206,318 B2 * | 4/2007 | Keller | 370/433 |
| 2003/0079013 A1 * | 4/2003 | I'Anson | 709/224 |
| 2003/0105825 A1 | 6/2003 | Kring et al. | |
| 2004/0248583 A1 * | 12/2004 | Satt et al. | 455/452.2 |

FOREIGN PATENT DOCUMENTS

| | | |
|---|---|---|
| DE | 100 46 345 | 9/2000 |
| WO | WO 99/05828 | 7/1998 |
| WO | WO 00/10357 | 9/1999 |
| WO | WO 02/52869 | 12/2000 |
| WO | WO 01/86851 | 5/2001 |
| WO | WO 02/87160 | 3/2002 |
| WO | WO 03/01784 | 5/2002 |

* cited by examiner

*Primary Examiner*—Marceau Milord
(74) *Attorney, Agent, or Firm*—Bell, Boyd & Lloyd

(57) ABSTRACT

The invention relates to a data traffic separation method for use in a packet-oriented mobile radio network. According to said method, data traffic arising in an access node of the mobile radio network and consisting of a plurality of layer 2 connections comprising a plurality of data flows each is separated with respect to a connection-specific and/or data flow-specific treatment and is optionally guided through a processing unit carrying out such a treatment. The invention further relates to a corresponding mobile radio network in which the inventive method can be applied.

13 Claims, 2 Drawing Sheets

DATA TRAFFIC SEPARATION METHOD FOR USE IN A PACKET-ORIENTED MOBILE RADIO NETWORK

CLAIM FOR PRIORITY

This application is a national stage of International Application No. PCT/DE2004/001153 which was published on Dec. 23, 2004 and which claims the benefit of priority to German Application No. 103 26 726.3 filed Jun. 10, 2003.

TECHNICAL FIELD OF THE INVENTION

The invention relates to a data traffic separation method for use in a packet-oriented mobile radio network.

BACKGROUND OF THE INVENTION

For network operators it is important to be able to distinguish between the traffic flows of subscribers, particularly in IP-based networks. Such a separation makes it possible for example for a network operator to approve for subscribers different authorizations for the quality and service quality of a data transmission which is referred to as "quality of service"—abbreviated to QoS—or to bill subscribers in accordance with different methods.

In the case of the GPRS mobile radio network it has been possible thus far for a subscriber to select an access point name (APN) which leads to different networks or to different handling of the traffic in the network of the corresponding operator. In such cases the access point name is connected to a so-called PDP (packet data protocol) context, which represents a layer 2 connection.

However, the method described is only used under some conditions by the network operators because it requires relatively high administration outlay.

Because of this methods are currently being introduced which, when a layer 2 connection (PDP context) and only one access point name is used, on the basis of the IP packets, which means on a layer 3 basis, allow the data traffic, meaning the data flows, to be distinguished. In order to identify data flows and their handling, a so-called "traffic plane handling function" is for example defined in this case. In the wider sense this thus involves a processing unit which can implement data flow-specific handling or functions. This handling can for example relate to the billing or to the QoS.

If only one access point name is used, this means that the entire traffic of a subscriber has to be routed via this processing unit in order to identify the individual data flows and for further handling of these flows such as, for example, billing, even if a part of the data traffic does not have to be handled in the processing unit. This would demand a high computing power for the processing unit, which would be very costly.

In addition, it is also very often the case that an overall layer 2 connection or a PDP context of a subscriber is to be subject to specific handling such as, for example, specific billing. In this case it is not necessary at the data flow level to identify each individual data flow of the relevant layer 2 connection because all the data flows of this layer 2 connection can be treated the same across the board.

SUMMARY OF THE INVENTION

The present invention provides a method by means of which it is possible to separate the data traffic as efficiently as possible and in such a way that one part of the data traffic that is to receive specific handling is routed to a processing unit provided for this purpose.

In accordance with one embodiment, a data traffic separation method for use in a packet-oriented mobile radio network is provided. In accordance with the method, data traffic arising in an access node of the mobile radio network and including a plurality of layer connections comprising a plurality of data flows in each case, is separated with respect to connection-specific and/or data flow-specific handling and is optionally routed proportionately via a processing unit performing such handling.

A GPRS network is preferably used as the mobile radio network. In this case, the access node then corresponds to that of a GGSN.

In general, layer 2 connections are terminated in the access node. If the access node decides to forward a layer 2 connection to the processing unit, this can be done in the form of the complete layer 2 connection, which then has to be terminated in the processing unit or the layer 2 connection is terminated in the access node and only that data contained in the layer 2 connection is forwarded to the processing unit. Within the framework of this invention, the connections involved are referred to as layer 2 connections in both cases.

In a particularly preferred embodiment of the method in accordance with the invention, a control function within the access node decides, based on the application-specific information and/or the local information of an information unit integrated in an access node, whether or not a layer 2 connection should be routed via a processing unit where then, based on the application-specific information and/or the local information, connection-specific and/or data flow-specific handling is performed in each case.

Preferably, when a communication to an application is set up by the subscriber, the application of a policy decision function transmits the application-specific information, namely, a so-called policy. The information and rules by means of which a network operator in his network can influence handling of services are called policies. As a result, the policy decision function, via an interface authorizes the access node of the mobile radio network in order to set up one or more layer 2 connections comprising a plurality of data flows in each case for the requested application and transmits the application-specific information, which means the policy. A control function within the access node decides based on the application-specific information and/or the local information or policies of an information unit integrated in the access node whether or not the layer 2 connection or connections should be routed via the processing unit where connection-specific and/or data flow-specific handling is then performed based on the application-specific information and/or the local information.

In a particularly preferred embodiment of the method in accordance with the invention, the policy decision function routes the application-specific information with respect to connection-specific handling of one layer 2 connection or a plurality of layer 2 connections to the access nodes and the application-specific information with respect to a data flow-specific handling of data flows within the one layer 2 connection or a plurality of layer 2 connections directly to the processing unit. This means that the control function within the access node on the basis of the application-specific information and/or the local information or policies with respect to the connection-specific handling of one layer 2 connection or a plurality of layer 2 connections first of all decides whether or not the layer 2 connection or the layer 2 connections are to be sent to the processing unit. If the one layer 2 connection or a plurality of layer 2 connections is routed to the processing unit, then it is possible that, based on the application-specific information with respect to a data flow-specific handling, which was directly routed to the processing unit, an additional separation with respect to the individual data flows of the layer 2 connection or the layer 2 connections now takes place there and the individual data flows are handled differently in accordance with the application-specific information. Therefore, in accordance with the invention, a hierarchical separation of the data traffic consisting of a plurality of layer 2 connections comprising a plurality of data flows is implemented in each case. First of all, a separation on the basis of the application-specific information and/or the local information or policies with respect to a connection-specific handling takes place in the access node; should in accordance with the information, one layer 2 connection or a plurality of layer 2 connections of the data traffic be subject to specific handling, it must be possible to route these layer 2 connections of the data traffic via the processing unit so that they can be subject to this handling there. These layer 2 connections of the data traffic are then routed completely, this means with all their data flows in each case, via the processing unit. Based on the additional application-specific information, however which now does not relate to connection-specific handling but data flow-specific handling, an additional separation is optionally carried out in the processing unit, but this time based on the data flows. In this case, those data flows, which are subject to special handling in accordance with the application-specific information with respect to the data flow-specific handling, are filtered out.

In another preferred embodiment of the method in accordance with the invention, the policy decision function routes the application-specific information with respect to data flow-specific handling of data flows within a layer 2 connection indirectly via the access node to the processing unit. The access node then identifies from the availability of the data flow-specific information that the data of one layer 2 connection or a plurality of specific layer 2 connections in which the corresponding data flows are located has to be routed via the processing unit.

In an especially preferred way, the application of the policy decision function transmits the billing information as the application-specific information. On the one hand, this application-specific information can refer to connection-specific handling but, on the other hand, also to data flow-specific handling. This means for example that an overall layer 2 connection is not billed or billed at special tariffs or that specific data flows of a layer 2 connection are not billed or billed at special tariffs. For example, if an overall layer 2 connection is for example not billed, this layer 2 connection will not be routed via the processing unit because additional handling is not needed. Because of this pre-separation of the layer 2 connections by the control unit in the access node, the processing unit is more balanced. In addition to the application-specific information, which is transmitted from an application to the policy decision function, it is possible, as has already been mentioned, that the local information or policies are also logged in the access node according to which the control function in the access node has to comply. In general, such local information is configured by an operator. For this purpose, so-called network management methods (operation administration management methods) are used. This local information is static, which means that it applies to all the layer 2 connections in the same way. Dynamic information only applies to a special layer 2 connection or to data flows especially contained in a layer 2 connection and preferably arrives at the access node via the policy decision function while the layer 2 connection is being signaled and authorized. This dynamic information is transmitted from an application to the policy decision function.

Preferably the information on the basis of which the control function for a layer 2 connection has to decide whether or not to route the layer 2 connection via the processing unit is the billing information and/or the QoS information.

In another particularly preferred embodiment of the method in accordance with the invention, the policy decision function sends as the application-specific information an explicit indicator to the access node, which gives the instruction to the control function to route the specific layer 2 connection or the PDP context via the processing unit.

The control function now decides, in accordance with the application-specific information which has reached it via the policy decision function, about the route for the corresponding layer 2 connection. However, the control function can also decide about the route of a layer 2 connection without having received the application-specific information from the policy decision function, based only on the local information. In the case of a simultaneous availability of the local information and the application-specific information from the policy decision function, a priority can be set, for example, the application-specific information has a higher priority than the said local information. The local information, which is logged statically in the access node could, for example, include that specific destination IP addresses are not billed or that specific QoS classes have been subject to specific billing, which either makes unnecessary or enforces a forwarding of the corresponding layer 2 connection via the processing unit.

In addition, the application-specific information can include the billing information on the basis of which the control function in the access node can decide whether or not it can carry out the billing itself or to route the corresponding layer 2 connection via the processing unit.

The billing information or a billing policy can, for example, determine that no billing, a billing in time, an IP volume billing, an offline billing or an online billing has to be carried out in each case. Depending on the type of billing, the corresponding data traffic has to be either routed via or not routed via the processing unit.

In another preferred embodiment of the method in accordance with the invention, the application-specific information is routed via an authentication, authorization and accounting server (AAA server), in particular via a remote access dial-in user-server (RADIUS) to the access node.

In addition, the present invention includes a mobile radio network which has at least one access node with a control function for separating data traffic arising in an access node consisting of a plurality of layer 2 connections comprising a plurality of data flows in each case in accordance with predetermined information and a processing unit for the handling of layer 2 connections separated by the control unit and routed to the processing unit.

Preferably the mobile radio network in accordance with the invention additionally includes a policy decision function for receiving, evaluating and the immediate forwarding of the application-specific information to the control function of the access node.

In a particularly preferred embodiment of the mobile radio network in accordance with the invention, the processing unit includes a filter function, which in incoming layer 2 connections can separate data flows in accordance with the data flow-specific information in such a way that these data flows can be subject to a data flow-specific handling in the processing unit.

In an additional preferred embodiment of the mobile radio network in accordance with the invention, the processing unit is integrated into the access node. The mobile radio network preferably concerns a GPRS network, which corresponds to access nodes, in this case a GGSN.

BRIEF DESCRIPTION OF THE DRAWINGS

Further advantages of the invention are explained in greater detail below with reference to the exemplary embodiments and figures. They are as follows.

DETAILED DESCRIPTION OF THE INVENTION

Figure 1:
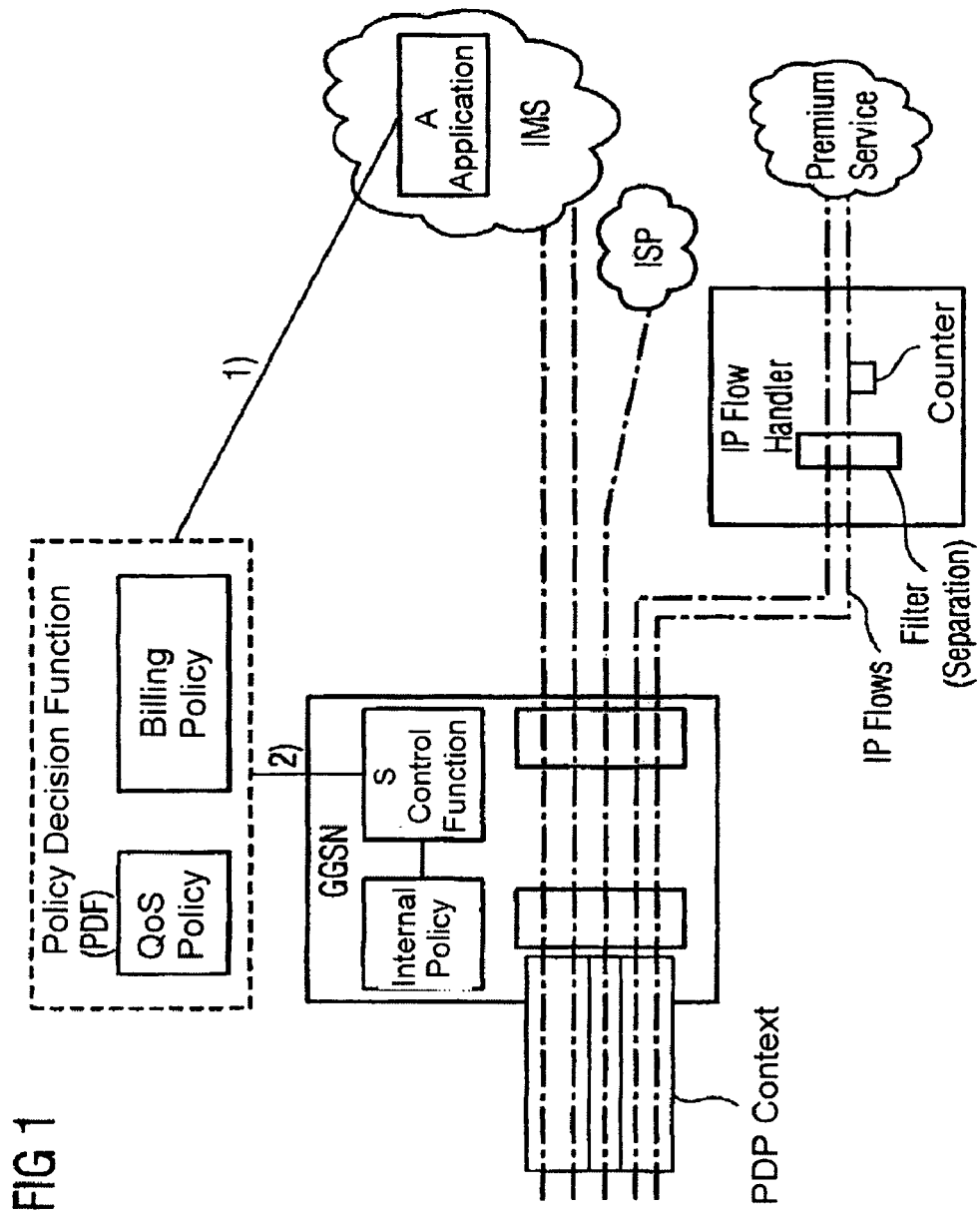
FIG. 1 shows an execution sequence of an embodiment of the method in accordance with the invention.

FIG. 1 shows schematically a section of a mobile radio network GPRS. An access node (access gateway) is shown which in the mobile radio network GPRS corresponds to a GGSN. The GGSN terminates layer 2 connections or PDP contexts via an access network, for example via a radio network. In addition, a processing unit is shown, which is also called the traffic plane handling function or in short the IP flow handler. This processing unit can carry out data flow-specific functions, this means IP flow-specific functions such as, for example, with respect to a specific billing or a specific transmission quality (QoS). In this case, the processing unit or the IP flow handler is separate from the access node or the GGSN. However, it can also be integrated in the access node. Over and above that, a policy decision function also called a policy decision function PDF is shown. In addition, an IP multimedia subsystem, in short called IMS, is shown. It is now possible for an operator to authorize a quality of service for a service requested by a subscriber, this means an application A, for example, an application of his IP multimedia subsystem IMS and to specify a specific billing method. For that, the application A must announce application-specific information or application-specific policies of the policy decision function PDF via an interface 1). To do this, the policy decision function PDF controls or authorizes the GGSN via an interface 2) on setting up, for example, a layer 2 connection, this means a PDP context. In the GGSN, a control function S is implemented, which can decide on the basis of different information whether or not a layer 2 connection or a PDP context has to be routed via the IP flow handler. For this decision, both application-specific policies, which arrive at the interface 2) from the policy decision function PDF in the GGSN and the local policies of an internal policy function can be used. Local policies, which are logged in an internal policy function in the GGSN, are configured by the operator and are static. This means that these types of policies apply in the same way for all the PDP contexts. Dynamic policies, which are routed from a specific application via an interface 1) to the policy decision function PDF and are then routed from there via an interface 2) to the GGSN only apply to a specific PDP context. Such policies preferably arrive during the signaling and authorizing of the corresponding PDP context via the interface 2) at the GGSN, for example, as a QoS or a billing (charging) policy. Via the interface 2), it is for example possible, for a specific application, to transmit a billing policy, which implies that for the layer 2 connection authorized for the application that no billing, time-based billing, IP volume billing, offline billing or online billing has to be carried out in each case. Based on this policy, the control function S decides whether or not it can perform the billing itself or whether or not the layer 2 connection has to be routed via the IP flow handler. In addition, the IP flow handler includes a filter function, which in incoming layer 2 connections can separate data flows in accordance with the data flow-specific information so that these data flows can be subject to data flow-specific handling in the processing unit.

Figure 2:
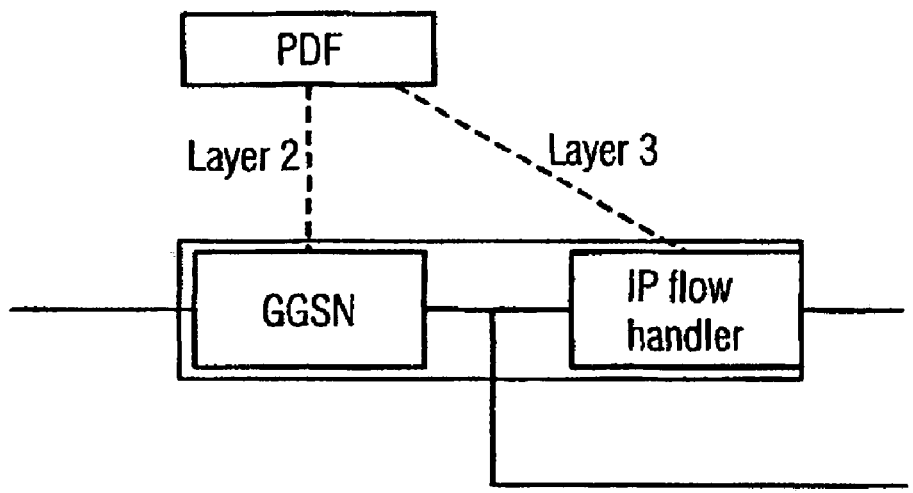
FIG. 2 shows the sequence of a partial step of another embodiment of the method in accordance with the invention.

FIG. 2 shows a section of a mobile radio network. The mobile radio network in this figure is again the GPRS mobile radio network. The diagram shows an access node GGSN, a processing function IP flow handler and a policy decision function PDF. While the connection-specific information, meaning information relating to a complete layer 2 connection or a PDP context, arrives from the policy decision function via an interface 2) at the GGSN, the data flow-specific information (layer 3 information) is now routed from the policy decision function PDF directly to the processing unit, meaning that it is routed to the IP flow handler. Data flow-specific handling based on the corresponding data flow-specific information is firstly carried out in the processing unit, meaning in the IP flow handler rather than in the GGSN. The incoming connection-specific information is evaluated in the GGSN in order to determine whether or not, in the GGSN, incoming data traffic consisting of a plurality of layer 2 connections comprising a plurality of data flows in each case has to be subject to uniform handling, which is optionally also carried out by the GGSN and does not have to be routed further from there to the IP flow handler or whether or not handling, be it connection-specific or a data flow-specific handling, has to be carried out by the IP flow handler and, therefore, the corresponding layer 2 connections of the data traffic have to be routed to the IP flow handler. This decision is based on the application-specific information, which was received from the policy decision function PDF, and/or the local information or the policies. In the IP flow handler, data flows are then optionally again separated if data flow-specific handling in accordance with the corresponding data flow-specific information is to be carried out for these.

Figure 3:
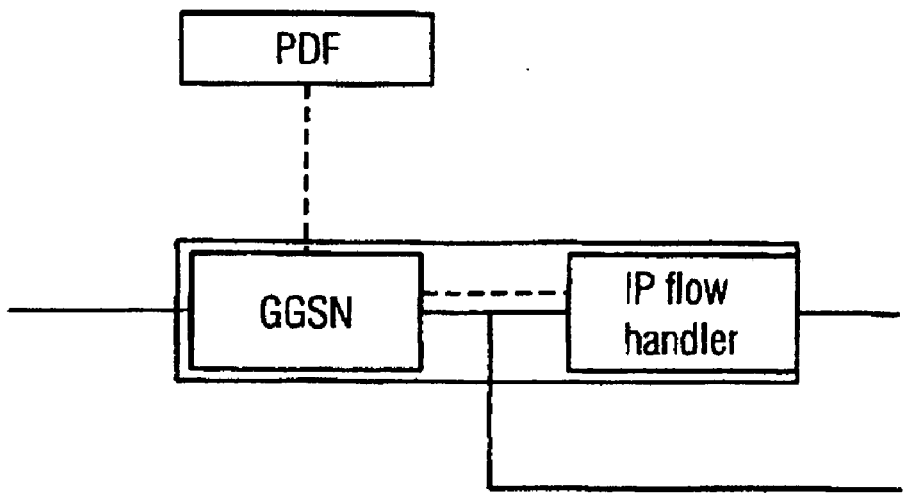
FIG. 3 shows the sequence of a partial step of another embodiment of the method in accordance with the invention.

FIG. 3 shows the same section of a mobile radio network GPRS as in FIG. 2. However, in this case data flow-specific information from the policy decision function PDF is not routed directly but indirectly together with the connection-specific information, as shown by the broken line, via the access node, the GGSN and from there to the IP flow handler. The GGSN identifies on the basis of data flow-specific information that the corresponding layer 2 connection or the corresponding PDP context in which the relevant data flows are located has to be routed via the IP flow handler. In the IP flow handler, the relevant data flows are then separated from the other data flows made available in the layer 2 connection and subject to specific handling in accordance with the data flow-specific information.

What is claimed is:

1. A data traffic separation method for use in a packet-oriented mobile radio network, comprising:
   separating data traffic arising in an access node of the mobile radio network, the data traffic including a plurality of layer 2 connections comprising a plurality of data flows in each case, with respect to connection-specific and/or data flow-specific handling, and is optionally routed proportionately via a processing unit performing such handling, wherein a control function within the access node decides, based on the application-specific information and/or the local information of an information unit integrated in an access node whether a layer 2 connection is to be routed via the processing unit where, based on the application-specific information and/or the local information, connection-specific and/or data flow-specific handling is carried out in each case.

2. The method in accordance with claim 1, wherein when a communication to an application is set up by a subscriber, the application of a policy decision function transmits the application-specific information and the policy decision function via an interface authorizes the access node of the mobile radio network to set up one layer 2 connection or a plurality of layer 2 connections comprising a plurality of data flows in each case for the requested application and transmits the application-specific information.

3. The method in accordance with claim 2, wherein the application-specific information is routed via an authentication, authorization and accounting server via a remote access dial-in user-server to the access node.

4. The method in accordance with claim 3, wherein the application-specific information with respect to connection-specific handling of the layer 2 connection is routed to the access node and the application-specific information with respect to data flow-specific handling of data flows within the layer 2 connection directly to the processing unit.

5. The method in accordance with claim 3, wherein the application-specific information with respect to data flow-specific handling of data flows within a layer 2 connection is routed indirectly via the access node to the processing unit.

6. Method in accordance with claim 2, wherein the processing unit is integrated into the access node of the mobile radio network.

7. The method in accordance with claim 2, wherein a GPRS network is used as the mobile radio network.

8. The method in accordance with claim 2, wherein the billing information is transmitted as the application-specific information.

9. The method in accordance with claim 2, wherein Quality of Service information is transmiffed as the application-specific information.

10. The method in accordance with claim 2, wherein the processing unit, in the case of a layer 2 connection routed thereto, carries out a data flow-specific separation or filtering and handling.

11. A mobile radio network, comprising:

an access node with a control function for separating data traffic arising in an access node including a plurality of layer 2 connections comprising a plurality of data flows in each case in accordance with the predetermined information; and a processing unit for handling data flows separated by the control function and layer 2 connections comprising a plurality of data flows in each case forwarded to the processing unit, wherein a control function within the access node decides, based on the application-specific information and/or the local information of an information unit integrated in an access node whether a layer 2 connection is to be routed via the processing unit where, based on the application-specific information and/or the local information, connection-specific and/or data flow-specific handling is carried out in each case.

12. The mobile radio network in accordance with claim 11, wherein the mobile radio network has a policy decision function for receiving, evaluating and the immediate forwarding of the application-specific information to the control function of the access node.

13. The mobile radio network in accordance with claim 11, wherein the processing unit comprises a filter function, which in incoming layer 2 connections, can separate data flows in accordance with the data flow-specific information so that these data flows can be subject to data flow-specific handling in the processing unit.

* * * * *